United States Patent Office 3,798,322
Patented Mar. 19, 1974

3,798,322
6 OR 7-SUBSTITUTED 4 OR 8-(AMINO-1-METHYL-BUTYLAMINO)QUINOLINES AS HYPOLIPIDEMIC AGENTS
Robert E. Manning, Mountain Lakes, N.J., assignor to Sandoz-Wander, Inc., Hanover, N.J.
No Drawing. Filed Jan. 27, 1971, Ser. No. 110,310
Int. Cl. A61k 27/00
U.S. Cl. 424—200    7 Claims

ABSTRACT OF THE DISCLOSURE 6 or 7-substituted 4 or 8-(4-amino-1-methylbutyl-amino)quinolines, e.g., 6-methoxy-8-(4-amino-1-methyl-butylamino)quinoline or 7-chloro-4-(4-diethylamino-1-methylbutylamino)quinoline. The compounds are useful as hypolipedemics.

---

This invention relates to 6 or 7-substituted 4 or 8-(4-amino-1-methylbutylamino)quinolines, acid addition salts thereof and to their use as hypolipidemics. The invention also relates to pharmaceutical compositions containing the above compounds as an active ingredient thereof and to the method of using such compositions for the treatment of lipidemia.

The compounds with which this invention is concerned may be represented by the following structural formula:

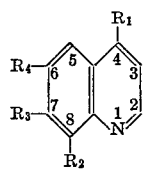

(I)

where $R_1$ is hydrogen or

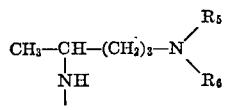

where $R_5$ and $R_6$ are, independently, hydrogen or lower alkyl having 1 to 4 carbon atoms, e.g., methyl, ethyl, propyl, isopropyl, butyl, or isobutyl, $R_2$ is hydrogen or

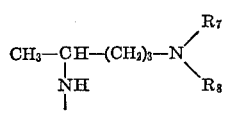

where $R_7$ and $R_8$ are, independently, hydrogen or lower alkyl having 1 to 4 carbon atoms, e.g., methyl, ethyl, propyl, isopropyl, butyl, or isobutyl, $R_3$ is hydrogen or chlorine, and $R_4$ is hydrogen or lower alkoxy having 1 to 4 carbon atoms, e.g., methoxy, ethoxy, propoxy, isopropoxy, butoxy, or isobutoxy;

provided that:

(1) when either $R_1$ or $R_3$ is hydrogen, then the other of $R_1$ or $R_3$ must be hydrogen, (2) when $R_1$ and $R_3$ are hydrogen $R_2$ and $R_4$ are not hydrogen, (3) when either $R_2$ or $R_4$ is hydrogen, then the other of $R_2$ or $R_4$ must be hydrogen, (4) when $R_2$ and $R_4$ are hydrogen $R_1$ and $R_3$ are not hydrogen, and (5) at least one of $R_1$ or $R_2$ must be hydrogen.

The compounds of Formula I may also be represented by the following structural formulas

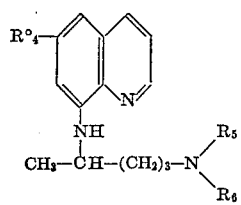  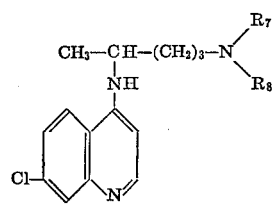

(Ia)    (Ib)

wherein $R_5$, $R_6$, $R_7$ and $R_8$ have the above-stated significance, and $R°_4$ is lower alkoxy having 1 to 4 carbon atoms, e.g., methoxy, ethoxy, propoxy, isopropoxy, butoxy or isobutoxy.

The compound of Formula Ia where $R°_4$ is methoxy and $R_5$ and $R_6$ are both hydrogen (Ia₁) is known [Elderfield et al. J. Am. Chem. Soc. 68, 1525 (1946) and Elderfield et al. ibid. 77, 4816 (1955)]; and the compound of Formula Ib where $R_7$ and $R_8$ are both ethyl (Ib₁) is also known (U.S.P. 2,233,970), and the present invention only contemplates the novel use of such compounds, particularly in the treatment of lipidemia.

Those compounds of Formulas Ia and Ib which are not specifically disclosed in the literature may be prepared by methods analogous to the preparation of (Ia₁) and (Ib₁) above from known materials.

The hypolipidemic use is indicated by the activity of Compounds Ia and Ib in male albino Wistar rats weighing 110–130 g. initially which are maintained on drug-free laboratory chow diet for seven days and then divided into groups of 8 to 10 animals. Each group with the exception of the control is then given orally 30–60 milligrams per kilogram of body weight per diem of the compound for six days. At the end of this period, the animals are anesthetized with sodium hexobarbital and bled from the carotid arteries. Serum or plasma samples are then extracted with isopropanol, and the cholesterol content of the extracts is estimated on the Technicon Autoanalyzer by standard methodology N24a (Technicon Manual).

The mean total serum cholesterol levels are then computed and the hypocholesterolemic activity is expressed as the fall in cholesterol levels as a percentage of the control level.

The triglyceride content of the extracts is determined using two Technicon autoanalyzer capsful of a mixture of zeolite-copper hydroxide and Lloydds reagent (Kessler, G., and Lederer, H., 1965, Technicon Symposium, Mediad Inc., New York, 345–347) which are added and shaken for one hour. After centrifugation, 2 ml. of the clear supernates are evaporated to dryness, saponified by addition of 0.1 ml. 10% KOH in 90% ethanol and 1.0 ml. Skelly B (petroleum ether B.P. 60–70°). After acidification and removal of fatty acids with petroleum ether, the aqueous phases are neutralized, suitably diluted with water, and analyzed for glycerol by the method of Lofland (Anal. Biochem. 9, 393, 1964) using the Technicon Autoanalyzer. The change in serum triglyceride levels induced by the drug is computed as a percentage of the control triglyceride levels.

As indicated, the compound of Formulas Ia and Ib are useful as hypolipidemics. For such usage, the compound may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The compounds of Formulas Ia and Ib may be similarly administered in the form of their nontoxic pharmaceutically acceptable acid addition salts. Representative of such salts are the hydrochloride, sulfate, phosphate, succinate, benzoate, acetate and the like. Such salts possess the same order of activity as the free base.

The compounds of Formula Ia and Ib may be prepared in acid addition salt form, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The dosage of active ingredient employed for the alleviation of lipidemia may vary depending on the severity of the condition being treated. However, in general, satisfactory results are obtained when the Compounds Ia and Ib are administered at a daily dosage of from about 1 mg. to about 200 mgs. per kg. of animal body weight, preferably given in divided doses two to four times a day, or in sustained release form. For most large mammals, the total daily dosage is from about 60 to 950 mgs. Dosage forms suitable for internal use comprise from about 15 to about 475 mgs. of the active compound.

The preferred pharmaceutical compositions from the standpoint of preparation and ease of administration are solid compositions, particularly hard-filled capsules and tablets.

The following examples are provided for the purpose of illustration and not by way of limitation. They are not intended so as to limit the scope of the invention as defined in the appended claims.

EXAMPLES 1 AND 2

Tablets and capsules suitable for oral administration

Tablets and capsules containing the ingredients indicated below may be prepared by conventional techniques and are useful in treating lipidemia at a dose of one tablet or capsule 2 to 4 times a day.

| Ingredient | Weight (mg.) Tablet | Capsule |
|---|---|---|
| 6-methoxy-8-(4-amino-1-methylbutylamino)quinoline diphosphate or 7-chloro-4-(4-diethylamino-1-methylbutylamino)quinoline phosphate | 50 | 50 |
| Tragacanth | 10 | |
| Lactose | 179.5 | 250 |
| Corn starch | 25 | |
| Talcum | 15 | |
| Magnesium stearate | 2.5 | |

EXAMPLES 3 AND 4

Sterile suspension for injection and oral liquid suspension

The following pharmaceutical compositions are formulated with the indicated amount of active agent using conventional techniques. The injectable suspension and the oral liquid suspension represent formulations useful as unit does and may be administered in the treatment of lipidemia. The injectable suspension is suitable for administration once a day whereas the oral liquid suspension is suitably administered 2 to 4 times per day for this purpose.

| Ingredients | Weight (mg.) Sterile injectable suspension | Oral liquid suspension |
|---|---|---|
| 6-methoxy-8-(4-amino-1-methylbutylamino)quinoline diphosphate or 7-chloro-4-(4-diethylamino-1-methylbutylamino)quinoline phosphate. | 50 | 50. |
| Sodium carboxy methyl cellulose USP | 1.25 | 12.5. |
| Methyl cellulose | 0.4 | |
| Polyvinylpyrrolidone | 5 | |
| Lecithin | 3 | |
| Benzyl alcohol | 0.01 | |
| Magnesium aluminum silicate | | Q.s. |
| Flavor | | Q.s. |
| Color | | Q.s. |
| Methyl paraben, USP | | 4.5. |
| Propyl paraben, USP | | 1.0. |
| Polysorbate 80 (e.g., Tween 80), USP | | 5. |
| Sorbitol silution, 70%, USP | | 2,500. |
| Buffer agent to adjust pH for desired stability. | Q.s. | Q.s. |
| Water | For injection, q.s. to 1 ml. | Q.s. to 5 ml. |

NOTE.—Q.s.=Quantity sufficient.

EXAMPLES 5 AND 6

Following the procedure of Examples 1 and 2, and in place of 6-methoxy - 8 - (4-amino-1-methylbutylamino) quinoline diphosphate or 7 - chloro-4-(4-diethylamino-1-methylbutylamino)quinoline phosphate starting with 6-methoxy-8-(4-dimethylamino-1-methylbutylamino)quinoline or 7 - chloro-4-(4-amino-1-methylbutylamino)quinoline tablets and capsules may be prepared which are useful in the treatment of lipidemia at a dose of one tablet or capsule 2 to 4 times a day.

EXAMPLES 7 AND 8

Following the procedures of Examples 3 and 4, and in place of 6-methoxy-8-(4-amino - 1 - methylbutylamino) quinoline diphosphate or 7-chloro-4-(4-diethylamino-1-methylbutylamino)quinoline phosphate starting with 6-methoxy - 8 - (4 - dimethylamino-1-methylbutylamino) quinoline or 7 - chloro-4-(4-amino-1-methylbutylamino) quinoline, sterile suspensions for injection and oral liquid suspensions may be prepared, which are useful in the treatment of lipidemia. The injectable suspension is suitable for administration once a day whereas the oral liquid suspension is suitably administered 2 to 4 times per day for this purpose.

What is claimed is:

1. The method for treating lipidemia which comprises orally administering to a mammal in need of said treatment an effective amount of a compound of the formula

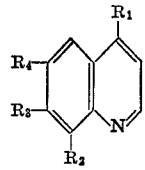

where
$R_1$ is hydrogen or

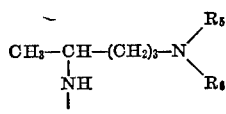

where
$R_5$ and $R_6$ are independently hydrogen or lower alkyl having 1 to 4 carbon atoms,
$R_2$ is hydrogen or

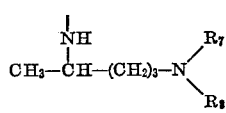

where
$R_7$ and $R_8$ are independently hydrogen or lower alkyl having 1 to 4 carbon atoms.
$R_3$ is hydrogen or chlorine, and
$R_4$ is hydrogen or lower alkoxy having 1 to 4 carbon atoms;
provided that
(1) when either $R_1$ or $R_3$ is hydrogen, then the other of $R_1$ or $R_3$ must be hydrogen,
(2) when $R_1$ and $R_3$ are hydrogen $R_2$ and $R_4$ are not hydrogen,
(3) when either $R_2$ or $R_4$ is hydrogen, then the other of $R_2$ or $R_4$ must be hydrogen,
(4) when $R_2$ and $R_4$ are hydrogen $R_1$ and $R_3$ are not hydrogen, and
(5) at least one of $R_1$ or $R_2$ must be hydrogen.

2. The method of claim 1 wherein the compound is administered at a daily dose of from about 60 milligrams to about 950 milligrams.

3. The method of claim 1 wherein the compound is administered in a unit dosage form comprising said compound to the extent of from about 15 milligrams to about 475 milligrams per unit dosage.

4. The method of claim 1 wherein the compound is 7-chloro-4-(4-diethylamino - 1 - methylbutylamino)quinoline phosphate.

5. A method for treating lipidemia which comprises orally administering to a mammal in need of said treatment an effective amount of the compound

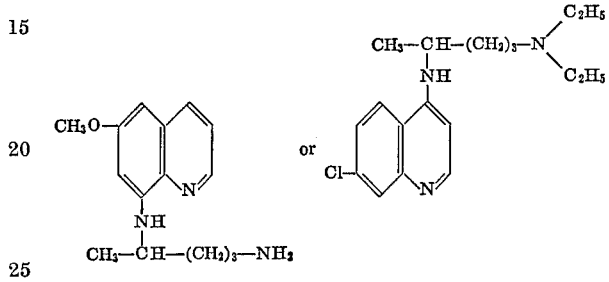

6. The method of claim 5 wherein the compound is administered at a daily dose of from about 60 milligrams to 950 milligrams.

7. The method of claim 5 wherein the compound is administered in a unit dosage form comprising said compound to the extent of from 15 milligrams to about 475 milligrams per unit dosage.

References Cited
FOREIGN PATENTS
940,477 12/1948 France ............. 424—258
72M 1/1961 France ............. 424—258

ALBERT T. MEYERS, Primary Examiner
F. E. WADDELL, Assistant Examiner

U.S. Cl. X.R.
424—258